United States Patent [19]

Akagi et al.

[11] Patent Number: 4,467,414
[45] Date of Patent: Aug. 21, 1984

[54] CASHE MEMORY ARRANGEMENT COMPRISING A CASHE BUFFER IN COMBINATION WITH A PAIR OF CACHE MEMORIES

[75] Inventors: Mikiya Akagi; Hiroyuki Nishimura; Hideki Nishimura, all of Tokyo, Japan

[73] Assignee: Nippon Electric Co., Ltd., Tokyo, Japan

[21] Appl. No.: 294,121

[22] Filed: Aug. 19, 1981

[30] Foreign Application Priority Data

Aug. 22, 1980 [JP] Japan ............................ 55-115533
Aug. 28, 1980 [JP] Japan ............................ 55-118627
Aug. 14, 1981 [JP] Japan ............................ 56-126579
Aug. 14, 1981 [JP] Japan ............................ 56-126581

[51] Int. Cl.³ .......................................... G06F 13/00
[52] U.S. Cl. .......................................... 364/200
[58] Field of Search ... 364/200 MS File, 900 MS File

[56] References Cited

U.S. PATENT DOCUMENTS 3,618,041  11/1971  Horikoshi et al. ............... 364/200
4,156,906   5/1979  Ryan ................................ 364/200
4,208,716   6/1980  Porter et al. .................... 364/200
4,217,640   8/1980  Porter et al. .................... 364/200

OTHER PUBLICATIONS

IBM Tech. Discl. Bull., vol. 23, No. 1, Jun. 80, written by Blount et al., "Deferred Cache Storing Method," pp. 262–263.

*Primary Examiner*—Eddie P. Chan
*Attorney, Agent, or Firm*—Sughrue, Mion, Zinn, Macpeak, and Seas

[57] ABSTRACT

In a cache memory arrangement used between a control processor (21) and a main memory (22) and comprising operand and instruction cache memories (31, 32), a cache buffer circuit (40) is responsive to storage requests from the central processor to individually memorize the accompanying storage data and store address data and to produce the memorized storage data and store address data as buffer output data and buffer output address data together with a buffer store request. Responsive to the buffer store request, first and second cache control circuits (36, 37) transfer for accompanying buffer output address data to the operand and the instruction cache memories, if each of the operand and the instruction cache memories is not supplied with any readout requests. Preferably, first and second coincidence circuits (51, 52) are coupled to the cache buffer circuit and responsive to the readout requests to compare all of the memorized store address data with the accompanying readout address data and to make the first and the second cache control circuits preferentially process the buffer store request prior to each of the readout requests. The buffer circuit may comprise two pairs of buffers (41, 42; 63, 64), each pair being for memorizing each of the store address data and the storage data. An address converter (70) may be attached to the arrangement to convert a logical address represented by each address data into a physical address.

6 Claims, 9 Drawing Figures

CASHE MEMORY ARRANGEMENT COMPRISING A CASHE BUFFER IN COMBINATION WITH A PAIR OF CACHE MEMORIES

BACKGROUND OF THE INVENTION

This invention relates to a cache memory arrangement for use between a central processor and a main memory and comprising a cache memory unit and a control circuit therefor.

In general, pipeline control is used to control an information processing system comprising a cache memory arrangement of the type described. In such an information processing system of a pipeline control type, it is preferable to raise a hit ratio of a cache memory unit and to avoid any turbulence or disturbance of the pipeline control.

For this purpose, a memory control system disclosed in U.S. Pat. No. 3,618,041, issued to Hisashi Horikoshi, comprises, as the cache memory unit, an instruction cache memory for memorizing instructions alone and an operand cache memory for memorizing operands alone. In this structure, instruction readout requests and operand readout requests are individually or independently given to the instruction and the operand cache memories, accompanying the instructions and the operands, respectively. Accordingly, no conflicts take place between the instruction and the operand readout requests even when both of the requests are concurrently delivered from a central processor to the cache memory unit.

As will later be described with reference to a few figures of the accompanying drawings, a cache memory unit is sometimes simultaneously supplied with readout requests and storage requests while the pipeline control proceeds. In other words, the readout requests often conflict with the storage requests at the cache memory unit. With the memory control system disclosed in the above-referenced United States Patent, such a conflict is unavoidable. Therefore, the pipeline control is disturbed on occurrence of the conflicts of the readout requests with the storage requests.

In IBM Technical Disclosure Bulletin Vol. 23, No. 1, p.p. 262-263 published on June 1, 1980, a proposal is made by F. T. Blount et al of deferring a store operation by the use of a single register to transfer stored data from the single buffer to the cache memory during an idle time of the cache memory when conflicts occur between readout and storage requests. This proposal is generally effective but becomes ineffective when storage requests consecutively appear from a central processor. In addition, the stored data in the single register may not be rapidly transferred to the cache memory because an idle time seldom appears in such a single cache memory.

SUMMARY OF THE INVENTION

It is an object of this invention to provide a cache memory arrangement which is capable of reducing the probability of any conflicts between instruction and operand readout requests and between storage and readout requests and thereby of avoiding disturbance of the pipeline control.

It is another object of this invention to provide a cache memory arrangement of the type described, wherein the pipeline control is not disturbed even when storage requests are consecutively received.

It is another object of this invention to provide a cache memory arrangement of the type described, wherein storage data to be stored in the cache memory unit are comparatively rapidly transferred to the cache memory unit during an idle time thereof.

A cache memory arrangement to which this invention is applicable is responsive to a sequence of operands and a sequence of instructions memorized in a main memory for making a central processor process the operands in compliance with the instructions in a pipeline fashion to produce storage requests and operand and instruction readout requests. The storage requests are accompanied by storage data and store address data. The operand and the instruction readout requests are accompanied by operand and instruction readout address data, respectively. The arrangement comprises a first cache memory coupled to the central processor and preliminarily loaded with a predetermined part of the operands, a first cache control circuit responsive to the operand readout requests and the accompanying operand readout address data for controlling the first cache memory, a second cache memory coupled to the central processor and preliminarily loaded with a preselected part of the instructions, a second cache control circuit responsive to the instruction readout requests and the accompanying instruction readout address data for controlling the second cache memory. According to this invention, a cache memory arrangement further comprises cache buffer means coupled to the central processor and responsive to the storage requests for individually memorizing the accompanying storage data and store address data to produce the memorized storage data and store address data in pairs as buffer output data and buffer output address data, respectively, together with a buffer store request, first means for supplying the buffer store request and the buffer output address data to the main memory and the first and the second cache control circuits, and second means for supplying the buffer output data to the main memory and the first and the second cache memories. The first cache control circuit comprises first selecting means coupled to the first means and responsive to the operand readout requests and the buffer store request for selecting the buffer store request and the operand readout requests when the operand readout requests are absent and otherwise, respectively, the selected buffer store request is accompanied by the buffer output address data and first producing means coupled to the first selecting means and the first cache and the main memories and responsive to the operand readout address data and the buffer output address data for producing the buffer output address data and the operand readout address data when the buffer store request is selected and not selected by the first selecting means, respectively. The first cache memory stores the buffer output data supplied through the second means in addresses specified by the produced buffer output address data. The produced operand readout address data are transferred to the first cache memory. The second cache control circuit comprises second selecting means coupled to the first means and responsive to said instruction readout requests and the buffer store request for selecting the buffer store request and the instruction readout requests when the instruction readout requests are absent and otherwise, respectively, the selected buffer store request being accompanied by the buffer output address data and second producing means coupled to the second selecting means and the second cache and the main memories and responsive to the instruction readout address data and the buffer output address data for producing the buffer output address data and the instruction readout address data when the buffer store request is selected and not selected by the second selecting means, respectively. The second cache memory stores the buffer output data supplied through the second means in addresses specified by the produced buffer output address data. The produced instruction readout address data are transferred to the second cache memory.

DESCRIPTION OF THE PREFERRED EMBODIMENTS

Figure 1:
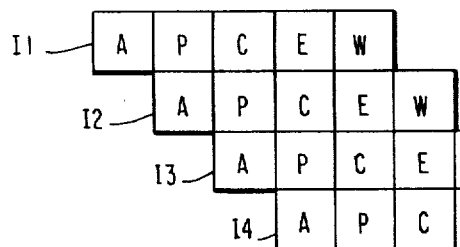
FIG. 1 shows a time chart for describing ideal pipeline control.
Figure 2:
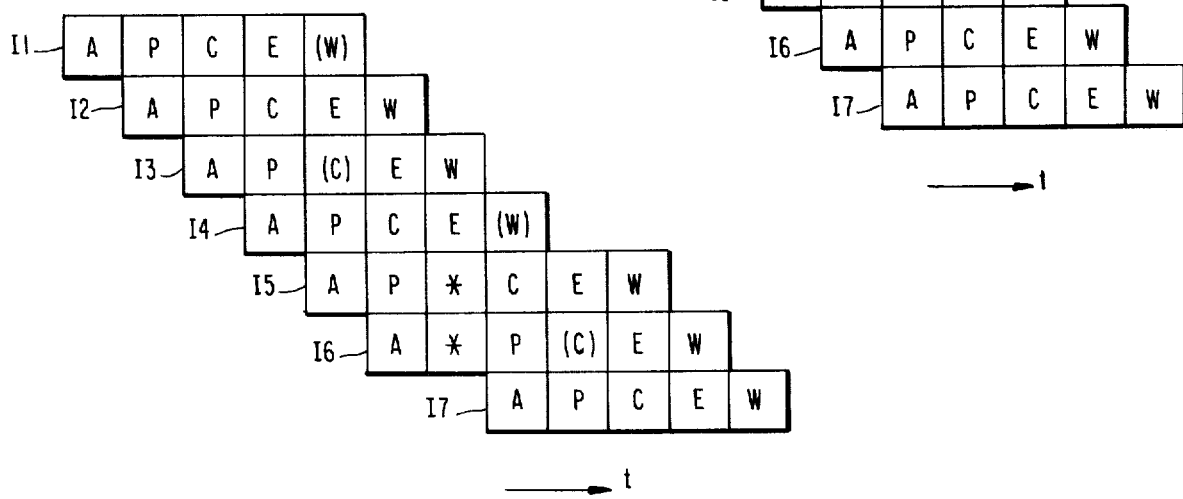
FIG. 2 shows a time chart for describing actual pipeline control.

Referring to FIGS. 1 and 2, pipeline control will be described at first for a better understanding of this invention. It is presumed that a cache memory is used to make a central processor process operands in compliance with instructions according to the pipeline control. Ideally, a plurality of instructions, such as first through seventh instructions $I_1, I_2, \ldots,$ and $I_7$, are processed in a manner illustrated in FIG. 1 according to the pipeline control. More particularly, the instructions $I_1$ through $I_7$ are successively executed with each instruction processed stepwise through steps A, P, C, E, and W.

Each instruction is first interpreted in the step A to discriminate a type of the instruction. Next, each instruction is processed in the step P to provide an operand address of an operand to be used in executing that instruction. For example, a logical address is converted to a physical address in the step P. This is because a program is usually described by the use of a logical address. In addition, calculation is carried out on the operand address when either a general register or an index register is indicated by the instruction including indirect addressing or indexing.

Subsequently, the operand is read out in the step C from the operand address obtained in the step P. When the operand is stored in the cache memory, the physical address obtained in the step P is supplied as the operand address to the cache memory to read out the operand in question. As a result, the readout operand is sent from the cache memory to the central processor. In the step E, each instruction is executed in the central processor with reference to the readout operand to produce results of execution. The step E is followed by the step W, in which the results are stored at a storage location indicated by each instruction. The storage location may be a register or a memory address of the cache memory. If the storage location is a memory address, a storage request is sent to the cache memory. When the memory address is present in the cache memory, any previously stored data in the memory address are rewriten into the results obtained in the step E.

As shown in FIG. 1, steps A, P, C, E, and W of the respective instructions $I_1$ through $I_7$ are processed by a shift of one step. In other words, the respective steps of each instruction alternate with those of the remaining instructions. For this purpose, a computer of a pipeline control type comprises hardware for independently and individually processing the respective steps. Thus, it becomes possible for an ideal pipeline control computer to process a program without any idle time and to improve a processing speed.

Pipeline control is disturbed when a conflict takes place between the instructions. It will now be assumed that the third instruction $I_3$ is for storing a result of calculation at a memory address of the cache memory without reading out any data or operand and that the fifth instruction $I_5$ is for reading out an operand from a memory address of the cache memory. The result of calculation has to be sent together with a storage request and address data to the cache memory in the step W of the third instruction $I_3$. On the other hand, a readout request should be sent together with address data to the cache memory in the step C of the fifth instruction $I_5$. The step W of the third instruction $I_3$ and the step C of the fifth instruction $I_5$ are processed concurrently. This means that the cache memory should simultaneously process the storage and the readout requests. However, it is impossible for the cache memory to simultaneously process two requests. Accordingly, a conflict of two requests takes place in the cache memory. On occurrence of such a conflict, a storage request is preferentially processed prior to a readout request in general. Therefore, the readout request should be suspended until processing of the storage request is completed in the cache memory. Thus, pipeline control is inevitably disturbed on occurrence of a conflict of a plurality of requests.

With the pipeline control, an idle time ideally fails to occur as described before. In fact, occurrence of an idle time is, however, inescapable even by the use of the pipeline control as will become clear as the description proceeds.

In FIG. 2, it will be presumed that the first instruction $I_1$ need not store the result of execution in a memory address of a memory as indicated with the letter W enclosed with parentheses and that the third instruction $I_3$ need not read out of an operand from a memory address. Examples of the former and the latter instructions $I_1$ and $I_3$ are instructions for storing the result in a general register and for reading out the operand from a general register, respectively. The step (W) of the first instruction $I_1$ concurs with the step (C) of the third instruction $I_3$. This means that the main memory and the cache memory themselves are not accessed during a period during which the step (C) of the instruction $I_3$ concurs with the step (W) of the instruction $I_1$. Therefore, the main memory and the cache memory are kept inactive during the period.

As described in the preamble of the instant specification, a proposal is made of a computer system comprising a cache memory and a single cache buffer register, in the above-referenced IBM Technical Disclosure Bulletin. On occurrence of a conflict of requests as regards the cache memory, the cache buffer register stores the results of execution and transfers them to the cache memory during an idle time of the cache memory. However, disturbance of the pipeline control is unavoidable when a plurality of results of execution should be consecutively stored in the cache buffer register in response to consecutive store requests as pointed out hereinabove. In addition, a result stored in the cache buffer register is kept in the cache buffer register for a long time without being transferred to the cache memory because an idle time seldom takes place in the cache memory.

Figure 3:
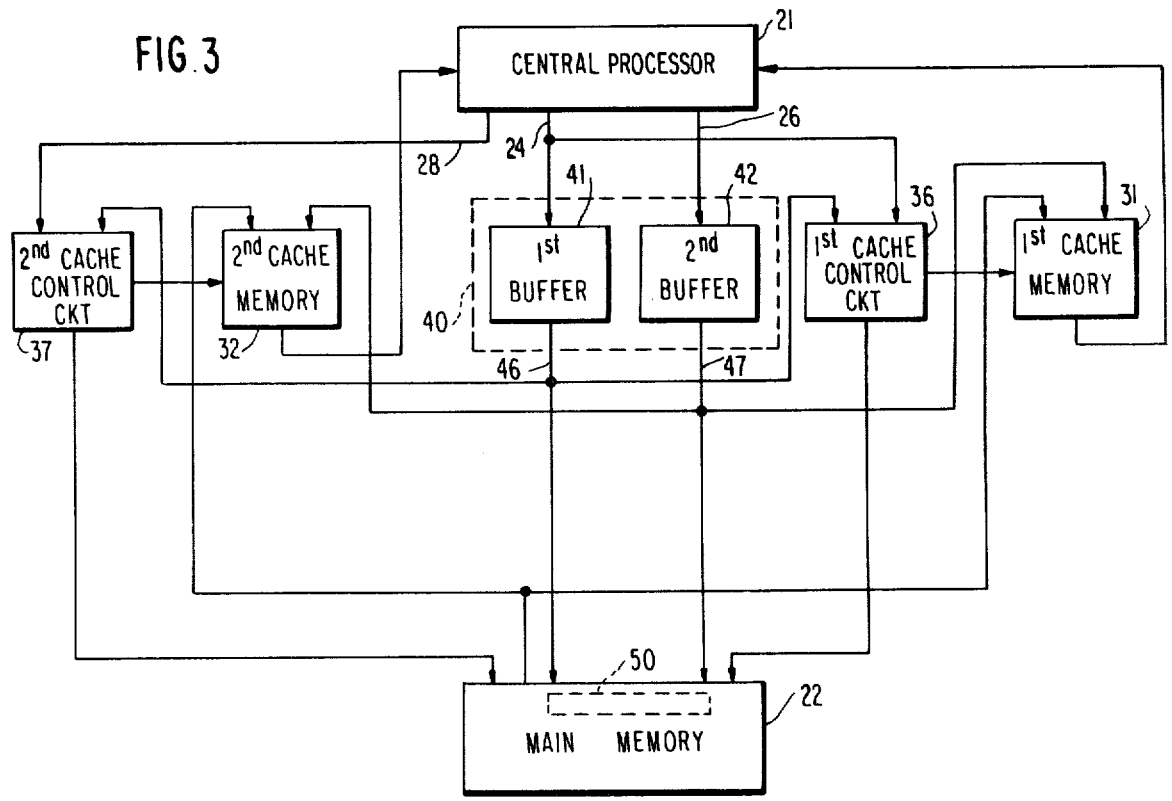
FIG. 3 is a block diagram of a cache memory arrangement according to a first embodiment of this invention.

Referring to FIG. 3, a cache memory arrangement according to a first embodiment of this invention is for use between a central processor 21 and a main memory 22. The main memory 22 is for memorizing a sequence of operands and a sequence of instructions. Briefly, the arrangement is for making the central processor 21 process the operands in compliance with the instructions in a pipeline fashion to produce storage requests and operand and instruction readout requests. The storage requests are accompanied by storage data and store address data. The operand and the instruction readout requests are accompanied by operand and instruction readout address data, respectively.

The central processor 21 comprises a known request decoder (not shown) for delivering the storage requests and the operand and the instruction readout requests through the cache memory arrangement to the main memory 22. The storage requests appear on a first output bus 24 together with the store address data. The accompanying storage data appear on a store data bus 26 after appearance of the respective storage requests. This is due to the pipeline control described with reference to FIGS. 1 and 2. The storage data are supplied as operands to the cache memory arrangement. The second output bus 26 may therefore be called an operand output bus.

The operand readout requests also appear on the operand or first address bus 24 together with the operand readout address data. The instruction readout requests appear on a second or instruction output bus 28 together with the instruction readout address data.

In FIG. 3, the cache arrangement comprises a first cache memory 31 coupled to the central processor 21 and preliminarily loaded with a predetermined part, namely, a plurality of blocks of the operands and a second cache memory 32 coupled to the central processor 21 and preliminarily loaded with a preselected part, namely, a plurality of blocks of the instructions. The first and the second cache memories 31 and 32 are put into operation under the control of first and second cache control circuits 36 and 37, respectively, in a manner to be described later.

The cache memory arrangement further comprises a cache buffer circuit 40 coupled to the central processor 21 through the first output bus 24 and through the storage data bus 26. The illustrated cache buffer circuit 40 comprises first and second buffers 41 and 42 each of which is of a first-in first-out type and has a predetermined number of entries which is, for example, eight in number. A single or validity bit is attached to each entry of the first and the second buffers 41 and 42 to indicate a validity of each entry and is changed from a logic "0" level to a logic "1" level when each entry is used.

Supplied with the storage requests through the first output bus 24, the first buffer 41 memorizes the accompanying store address data in a predetermined entry with the validity bit changed to the logic "1" level. After production of the storage requests, the accompanying storage data are produced by the central processor 21 in the pipeline fashion. The accompanying storage data is supplied through the storage data bus 26 to the second buffer 42 to be memorized in a preselected entry of the second buffer 42 which entry corresponds to the predetermined entry of the first buffer 41. The validity bit of the preselected entry is also changed to the logic "1" level. Under the circumstances, the memorized storage data and the memorized store address data are successively and simultaneously shifted in pairs and are produced as buffer output data and buffer output address data, respectively.

Simultaneously with production of the buffer output data and the buffer output address data, a buffer store request is produced by monitoring both of the validity bits of the first and the second memories 41 and 42.

The buffer output address data are delivered through a first buffer output bus 46 from the first buffer 41 to the main memory 22 and to the first and the second cache control circuits 36 and 37. The illustrated cache buffer circuit 40 sends the buffer store request on the first buffer output bus 46 together with the buffer output address data. On the other hand, the buffer output data are delivered through a second buffer output bus 47 from the second buffer 42 to the main memory 22 and to the first and the second cache memories 31 and 32.

Figure 4:
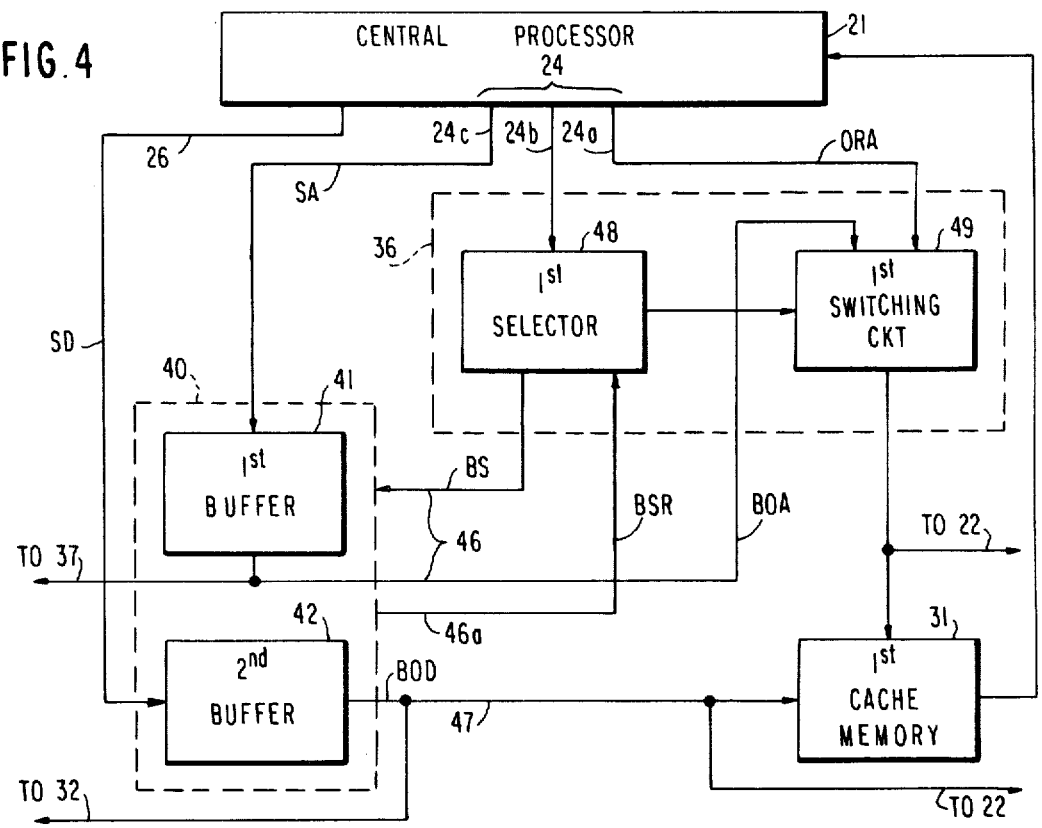
FIG. 4 is a block diagram of a first cache control circuit illustrated in FIG. 3.

Referring to FIG. 4, the first cache control circuit 36 is connected to the central processor 21 through an operand readout address line 24a and an operand readout request line 24b both of which are included in the first output bus 24. The operand readout address data ORA and the operand readout requests ORR appear on the operand readout address line 24a and the operand readout request line 24b, respectively.

The first cache control circuit 36 comprises a first selector 48 coupled to the first buffer output bus 46 and responsive to the operand readout requests ORR and the buffer store request, designated by BSR, for selecting the buffer store request BSR only when the operand readout requests ORR are absent. Otherwise, the first selector 48 selects the operand readout requests ORR. In other words, the operand readout requests ORR are preferentially selected by the first selector 48. In the presence of the operand readout requests ORR, the first selector 48 supplies the cache buffer circuit 40 with a busy signal BS.

Coupled to the first selector 48 in the first cache control circuit 36, a first switching circuit 49 is supplied with the operand readout address data ORA and the buffer output address data, indicated at BOA. The first switching circuit 49 produces the operand readout address data ORA and the buffer output address data BOA when the operand readout requests ORR and the buffer store request BSR are selected by the first selector 48, respectively.

The operand readout address data ORA are delivered from the first switching circuit 49 to the first cache memory 31 together with the operand readout requests ORR. When the operand readout address data ORA specify addresses in the first cache memory 31, the operands are transferred from the first cache memory 31 to the central processor 21. Otherwise, the operands are transferred from the main memory 22 to the central processor 21.

When the buffer output address data BOA are supplied from the first switching circuit 49 to the first cache memory 31, the accompanying buffer output data, denoted by BOD, also are simultaneously supplied to the first cache memory 31. If the buffer output address data BOA specify addresses in the first cache memory 31, the accompanying buffer output data BOD are memorized in the cache memory 31. If not, the accompanying buffer output data BOD are memorized in the main memory 22.

Although not shown in FIG. 4, the second cache control circuit 37 is similar in structure and operation to the first cache control circuit 36 except that the instruction readout requests and the instruction readout address data are supplied to the second cache control circuit 37 instead of the operand readout requests and the operand readout address data. Accordingly, it is readily understood that the second cache control circuit 37 comprises a second selector coupled to the first buffer output bus 46 and responsive to the instruction readout requests and the buffer store request for selecting the buffer store request only when the instruction readout requests are absent and otherwise for selecting the instruction readout requests and a second switching circuit coupled to the second selector and responsive to the instruction readout address data and the buffer output address data for producing the buffer output address data to store the buffer output data in the second cache memory 32 when the buffer store request is selected by the second selector and otherwise for producing the instruction readout address data to transfer the instructions from the second cache memory 32 to the central processor 21.

Further referring to FIG. 4, operation will be described more in detail.

Let the first and the second buffers 41 and 42 preliminarily memorize store address data SA and storage data SD supplied through a store address line 24c of the first output bus 24 and through the storage data bus 26, respectively.

Now, it will be presumed that the buffer store request BSR concurs with a simultaneously supplied one of the operand readout requests ORR at the first selector 48. In this case, the simultaneously supplied operand readout request ORR is selected by the first selector 48 to be supplied to the first switching circuit 49. At the same time, the busy signal BS is returned back from the first selector 48 to the first buffer 41. As a result, the buffer store request BSR is kept in the first buffer 41 until the busy signal BS disappears.

Responsive to the simultaneously supplied operand readout request ORR, the first switching circuit 49 selects the operand readout address data ORA accompanied by the simultaneously supplied operand readout request ORR. The selected operand readout address data ORA are delivered to the first cache memory 31 and the main memory 22 to transfer the operands in the manner described before.

When no operand readout request appears after processing the operand readout request ORR, the busy signal BS disappears. As a result, the buffer store request BSR is supplied through the first selector 48 to the first switching circuit 49.

Responsive to the buffer store request BSR supplied through the first selector 48, the first switching circuit 49 delivers the accompanying buffer output address data BOA to the first cache memory 31 together with the accompanying buffer output data BOD when the address specified by the buffer output address data BOA is present in the first cache memory 31. As a result, the buffer output data BOD is stored through the first control section 48 in the address specified by the buffer output address data BOA.

On the other hand, the address specified by the buffer output address data BOA may not be present in the first cache memory 31. In this event, the buffer output address data BOA and the accompanying buffer output data BOD are delivered to the main memory 22 from the first control section 48 and from the second buffer 42, respectively.

As illustrated in FIG. 3, the main memory 22 comprises a memory buffer circuit 50 substantially equal in structure to the cache buffer circuit 40, namely, a combination of the first and the second buffers 41 and 42. The memory buffer circuit 50 successively stores the buffer output address data BOA and the buffer output data BOD.

Similar operation is carried out in the second cache control circuit 37.

Thus, each of the first and the second cache control circuits 36 and 37 processes the operand and the instruction readout requests prior to the storage requests. In other words, the storage requests are capable of being delayed by virtue of the cache buffer circuit 40 until any conflicting readout requests are processed by the use of the first and the second cache memories 31 and 32. Therefore, it is possible to avoid conflicts between the readout requests and the storage requests. In addition, the buffer output address data and the accompanying buffer output data are comparatively rapidly transferred from the cache buffer circuit 40 to the first and the second cache control circuits 36 and 37 and to the first and the second cache memories 31 and 32. This is because idle times frequently appear as a result of presence of a pair of the cache memories 31 and 32, as compared with the use of a single cache memory. Furthermore, the cache buffer circuit 40 is capable of storing a plurality of the storage data together with the accompanying store address data. Accordingly, no turbulence takes place in the pipeline control even when the storage requests are consecutively issued from the central processor 21 to the cache buffer circuit 40.

Figure 5:
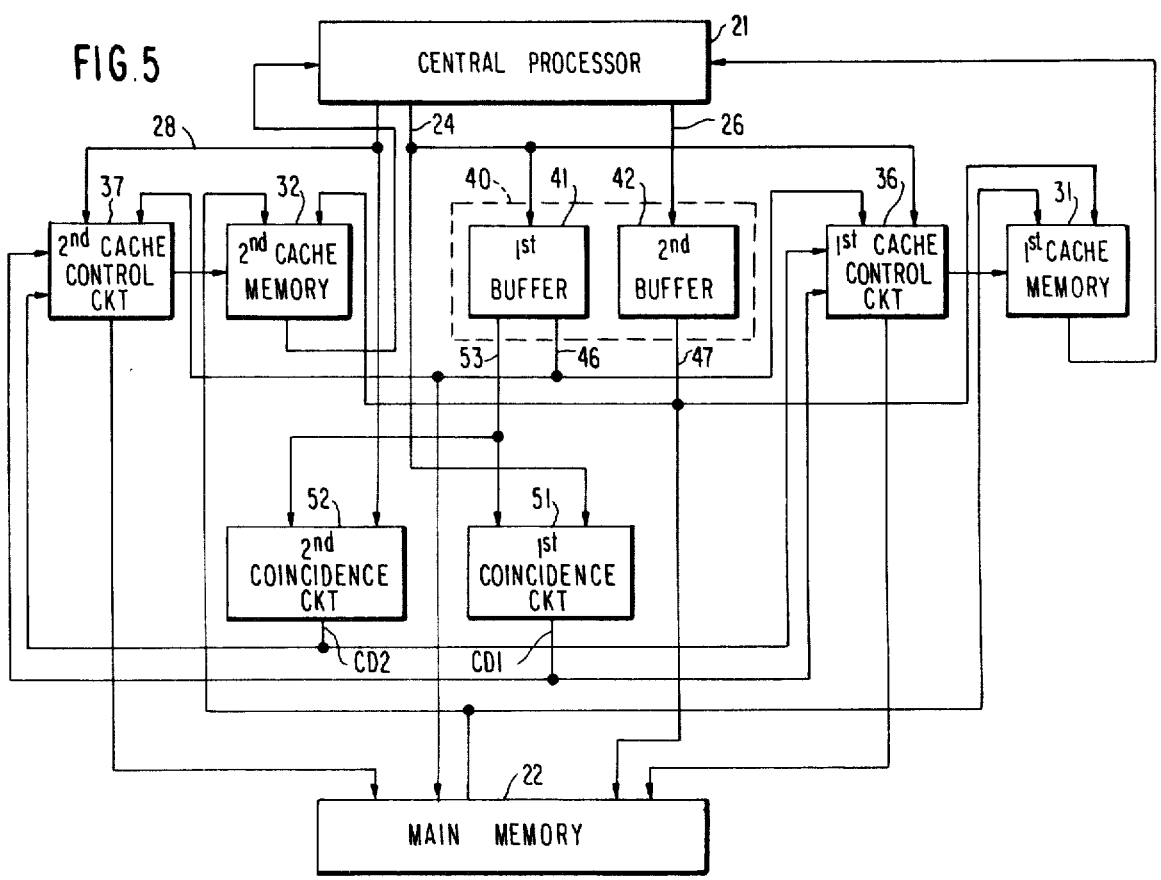
FIG. 5 is a block diagram of a cache memory arrangement according to a second embodiment of this invention.

Referring to FIG. 5, a cache memory arrangement according to a second embodiment of this invention is similar to that illustrated with reference to FIGS. 3 and 4 except that first and second coincidence circuits 51 and 52 are connected to the cache buffer circuit 40. Elements equivalent to those illustrated in FIGS. 3 and 4 are designated by like reference numerals.

Although not described with reference to FIGS. 3 and 4, it should be understood that each of the operand and the instruction readout requests may require data or operands memorized in the cache buffer circuit 40. Inasmuch as the data in the cache buffer circuit 40 are those to be transferred to the first or second cache memory 31 or 32 and the main memory 22, each of the first and the second cache memories 31 and 32 stores data older than those kept in the cache buffer circuit 40. Under the circumstances, malfunction would inevitably take place if data are read out from each of the first and the second cache memories 31 and 32 in spite of the fact that the corresponding data are held in the cache buffer circuit 40.

In order to avoid such malfunction, addresses in the first buffer 41 are monitored or indexed by the use of the first and the second coincidence circuits 51 and 52 in the cache memory being illustrated.

In FIG. 5, the first and the second coincidence circuits 51 and 52 are coupled to the first buffer 41 through an address comparing line 53 in common and coupled to the first and the second cache control circuits 36 and 37, respectively. The first coincidence circuit 51 is supplied with the operand readout requests and the operand readout address data through the first output bus 24 while the second coincidence circuit 52, with the instruction readout requests and the instruction readout address data through the second output bus 28.

Responsive to the operand readout requests accompanied by the operand readout address data, the first coincidence circuit 51 compares the operand readout address data with all of the store address data memorized in the first buffer 41. When the compared address data are coincident with each other, a first coincidence signal $CD_1$ is supplied from the first coincidence circuit 51 to the first cache control circuit 36 to energize the same in a manner to be described. The first coincidence signal $CD_1$ is also supplied to the second cache control circuit 37 to deenergize the same in a manner to be described.

Supplied with the instruction readout requests and the accompanying instruction address data, the second coincidence circuit 52 compares the instruction readout address data with all of the store address data memorized in the first buffer 41. When the compared address data are coincident with each other, a second coincidence signal $CD_2$ is supplied to the second cache control circuit 37 to energize the same on the one hand and to the first cache control circuit 36 to deenergize the same on the other hand.

Thus, the first and the second cache control circuits 36 and 37 selectively put into operation during presence of the first and the second coincidence signals $CD_1$ and $CD_2$. When none of the first and the second coincidence signals $CD_1$ and $CD_2$ are produced by the first and the second coincidence circuits 51 and 52, operation of the arrangement 20 is similar to that illustrated with reference to FIGS. 3 and 4. Therefore, the following description will mainly be concerned with the case where the first or the second coincidence signals $CD_1$ and $CD_2$ appears.

Figure 6:
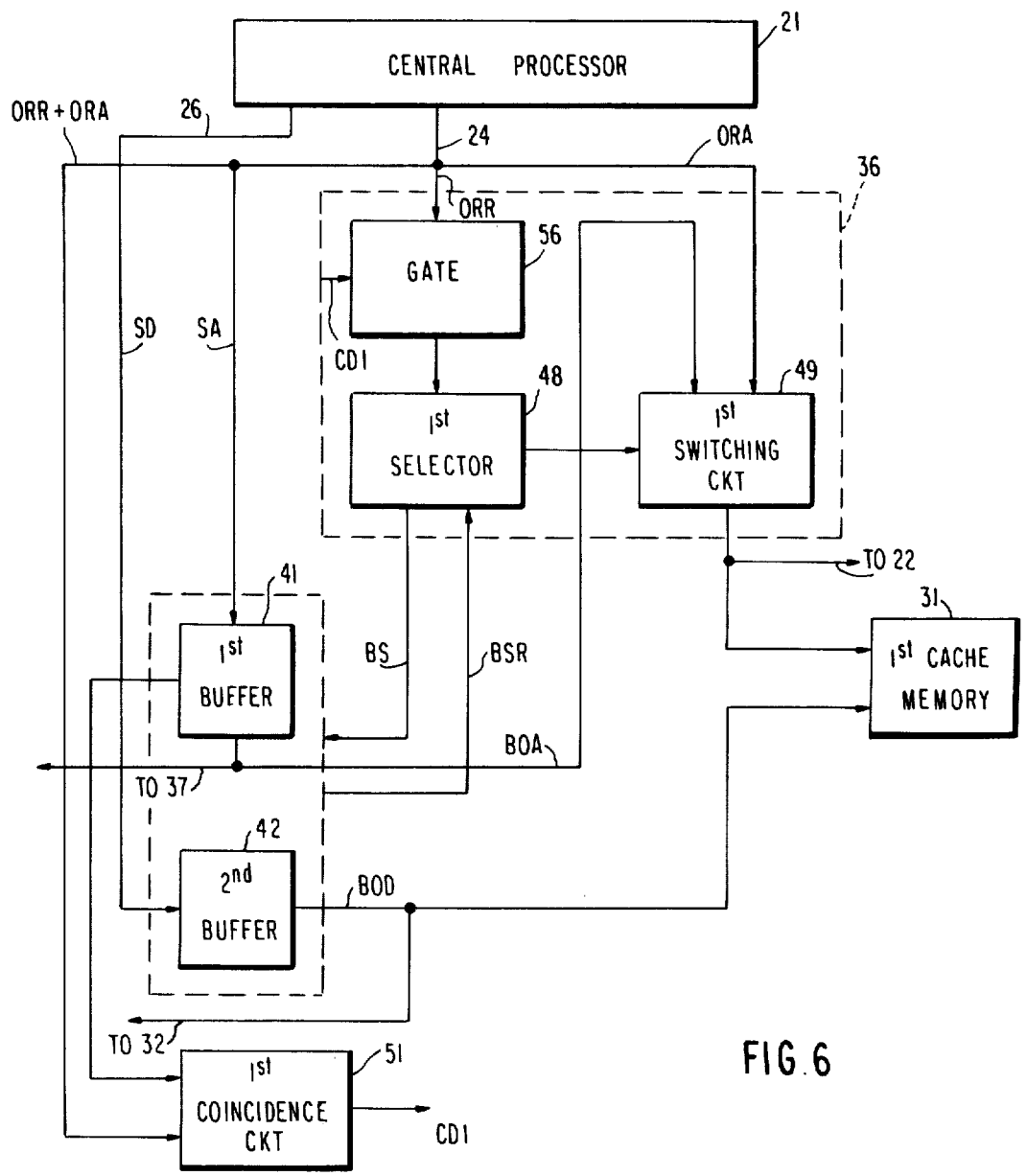
FIG. 6 is a block diagram of a first cache control circuit for use in the circuit shown in FIG. 5.

Referring to FIG. 6, the first cache control circuit 36 for use in the cache memory arrangement being described, comprises a first selector 48 and a first switching circuit 49, as is the case with that illustrated in FIG. 4. In FIG. 6, the first cache control circuit 36 further comprises a first gate 56 coupled to the central processor 21, the first coincidence circuit 51, and the first selector 48. Simultaneously supplied with the operand readout requests ORR through the first output bus 24 and the first coincidence signal $CD_1$, the first gate 56 interrupts the operand readout requests ORR. As a result, the buffer store request BSR alone is received by the first selector 48 during presence of the first coincidence signal $CD_1$ if the cache buffer circuit 40 produces the buffer store request BSR. Therefore, the first selector 48 selects the buffer store request BSR and the first switching circuit 49 selects the accompanying buffer output address data BOA.

The buffer output address data BOA are supplied through the first switching circuit 49 to the first cache memory 31 together with the accompanying buffer output data BOD. When the buffer output address data BOA specify addresses in the first cache memory 31, the accompanying buffer output data BOD are memorized in the first cache memory 31. Otherwise, the accompanying buffer output data BOD are sent to the main memory 22 in the usual manner.

Thus, the buffer store request BSR is preferentially processed by the first cache control circuit 36 prior to the simultaneously supplied one of the operand readout requests ORR in the presence of the first coincidence signal $CD_1$.

This means that the simultaneously supplied operand readout request ORR can read out those renewed operand data either from the first cache memory 31 or the main memory 22 which are rewritten by the buffer store request BSR when the request ORR in question requires operands memorized in the cache buffer circuit 40.

In addition, the buffer output data BOD may successively be transferred to the first cache memory 31 in a first-in first-out fashion until a "coincidence address" at which the compared address data are coincident with each other. Alternatively, the buffer output data BOD may be transferred from the coincidence address of the cache buffer circuit 40 alone.

The second cache control circuit 37 is put into operation in a manner similar to the first cache control circuit 36 and will not be described any further. It will readily be understood that the second cache control circuit 37 comprises a second gate (not shown) for interrupting the instruction readout requests in the presence of the second coincidence signal $CD_2$ to preferentially process the buffer store request prior to the simultaneously supplied one of the instruction readout requests.

Figure 7:
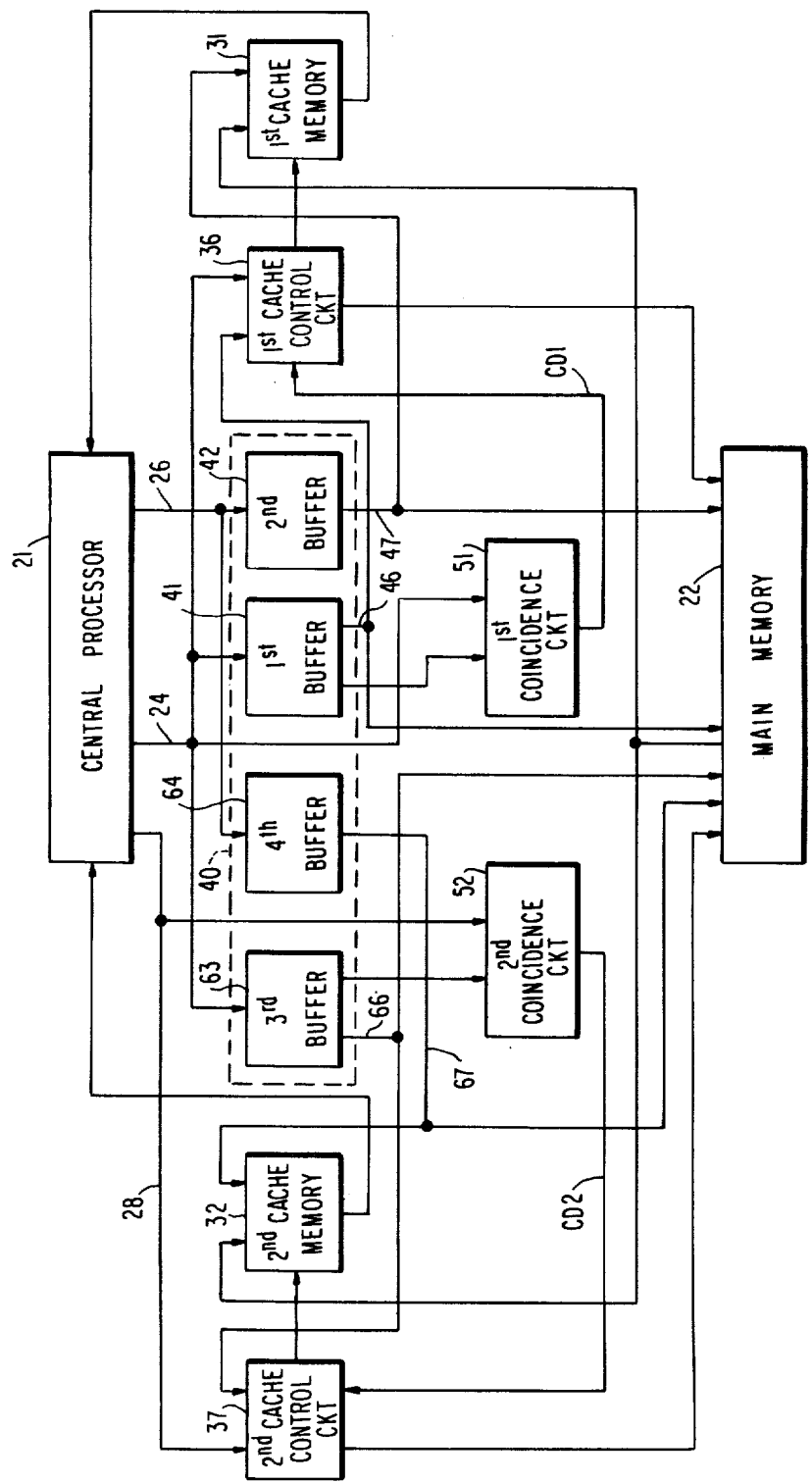
FIG. 7 is a block diagram of a cache memory arrangement according to a third embodiment of this invention.

Referring to FIG. 7, a cache memory arrangement according to a third embodiment of this invention is similar to that illustrated with reference to FIGS. 5 and 6 except that the cache buffer circuit 40 comprises third and fourth buffers 63 and 64 in addition to first and second buffers 41 and 42. As is the case with the first buffer 41, the third buffer 63 is coupled to the central processor 21 and responsive to the store requests for memorizing the accompanying store address data to produce the buffer address data. Like the second buffer 42, the fourth buffer 64 is coupled to the central processor 21 and responsive to the storage requests for memorizing the accompanying storage data to produce the buffer output data.

It is to be noted that the first and the second buffers 41 and 42 are not coupled to the second cache control circuit 37 and the second cache memory 32, respectively, and that the third and the fourth buffers 63 and 64 are not coupled to the first cache control circuit 36 and the first cache memory 31, respectively. In other words, the first and the second buffers 41 and 42 are connected to the first cache control circuit 36 and the first cache memory 31 through the first and the second buffer output buses 46 and 47, respectively. On the other hand, the third and the fourth buffers 63 and 64 are connected to the second cache control circuit 37 and the second cache memory 32 through third and fourth buffer output buses 66 and 67, respectively.

In the cache memory arrangement being illustrated, the buffer store requests are produced together with the buffer output address data and the accompanying buffer output data in the aforementioned manner and are supplied through the first and the third buffer output buses 46 and 66 to the first and the second cache control circuits 36 and 37, respectively.

The first coincidence circuit 51 is supplied with the operand readout requests through the first output line 24 and the store address data memorized in the first buffer 41 to produce the first coincidence signal $CD_1$ when the compared address data are coincident with each other. The first coincidence signal $CD_1$ is given to the first cache control circuit 36.

The second coincidence circuit 52 is supplied with the instruction readout requests through the second output line 28 and the store address data memorized in the third buffer 63 to produce the second coincidence signal $CD_2$ when the compared address data are coincident with each other. The second coincidence signal $CD_2$ is given to the second cache control circuit 37.

Thus, the first coincidence circuit 51 is operable independently of the second coincidence circuit 52. Therefore, the first and the second cache control circuits 36 and 37 are capable of individually processing the operand and the instruction readout requests in parallel even when the first and the second coincidence signals $CD_1$ and $CD_2$ are simultaneously produced by the first and the second coincidence circuits 51 and 52. In each of the first and the second cache control circuits 36 and 37, the buffer store request is preferentially processed prior to the simultaneously supplied one of the operand readout requests in the presence of each of the first and the second coincidence signals $CD_1$ and $CD_2$ in the above-described manner. Such processing or operation serves to avoid any malfunction of the arrangement even when a preceding buffer store request and a succeeding readout request access the same memory address allotted to the first or the second cache memory 31 or 32 and/or the main memory 22. This is because the data of the memory address in question are already renewed on processing the preceding buffer store request prior to reception of the succeeding readout request. In the absence of the respective first and second coincidence signals $CD_1$ and $CD_2$, the first and the second cache control circuits 36 and 37 first process the operand and the instruction readout requests and thereafter the buffer store request.

Figure 8:
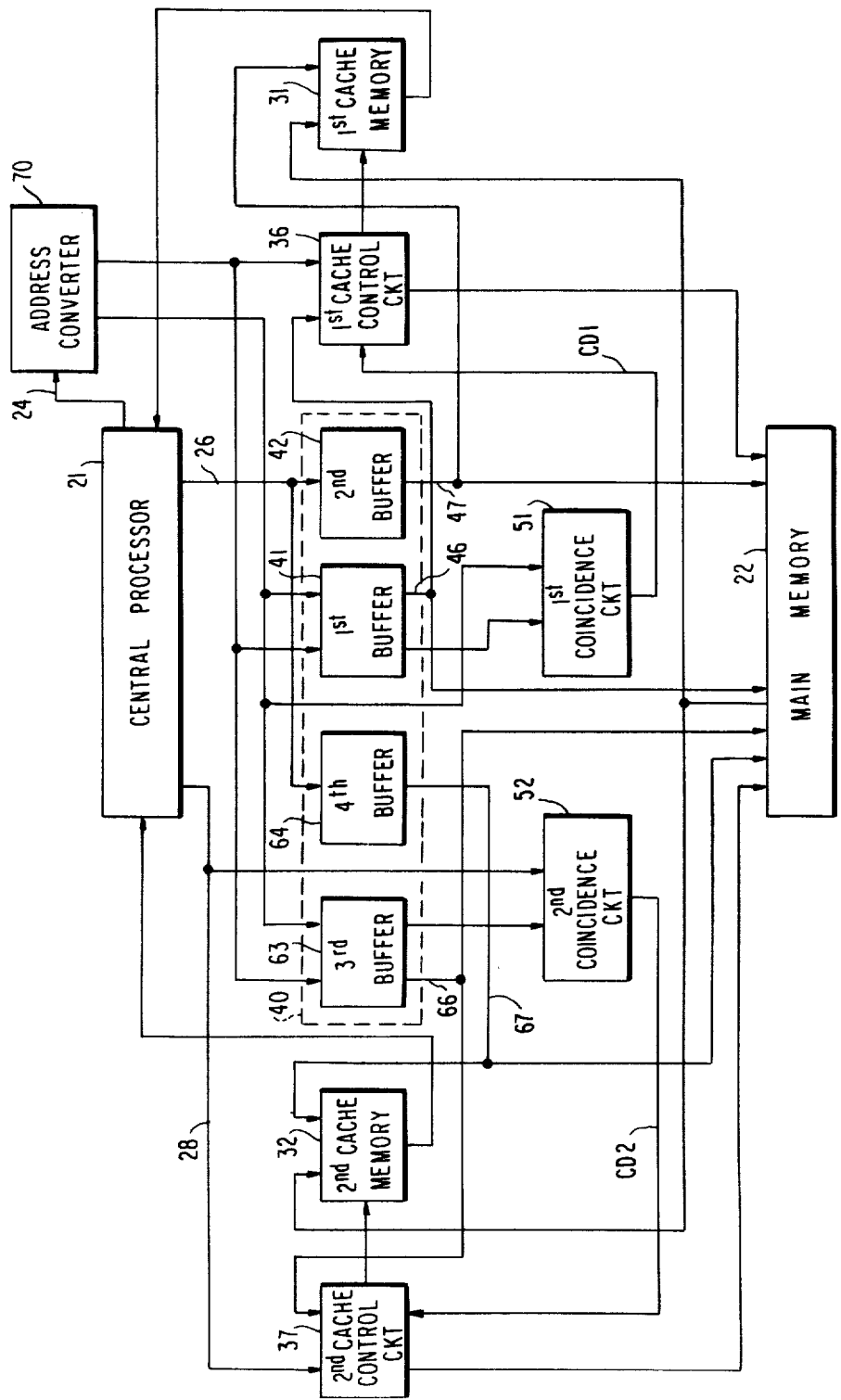
FIG. 8 is a block diagram of a cache memory arrangement according to a fourth embodiment of this invention.

Referring to FIG. 8, a cache memory arrangement according to a fourth embodiment of this invention is similar to that illustrated with reference to FIG. 7 except that an address converter 70 is coupled to the central processor 21 as best shown in FIG. 8. In the arrangement under consideration, each of the store address data and the operand and the instruction readout address data is supplied in the form of a logical address datum from the central processor 21. The address converter 70 is for converting the logical address datum into a physical address datum. The logical address datum is indicative of a logical address while the physical address is indicative of a physical address.

Figure 9:
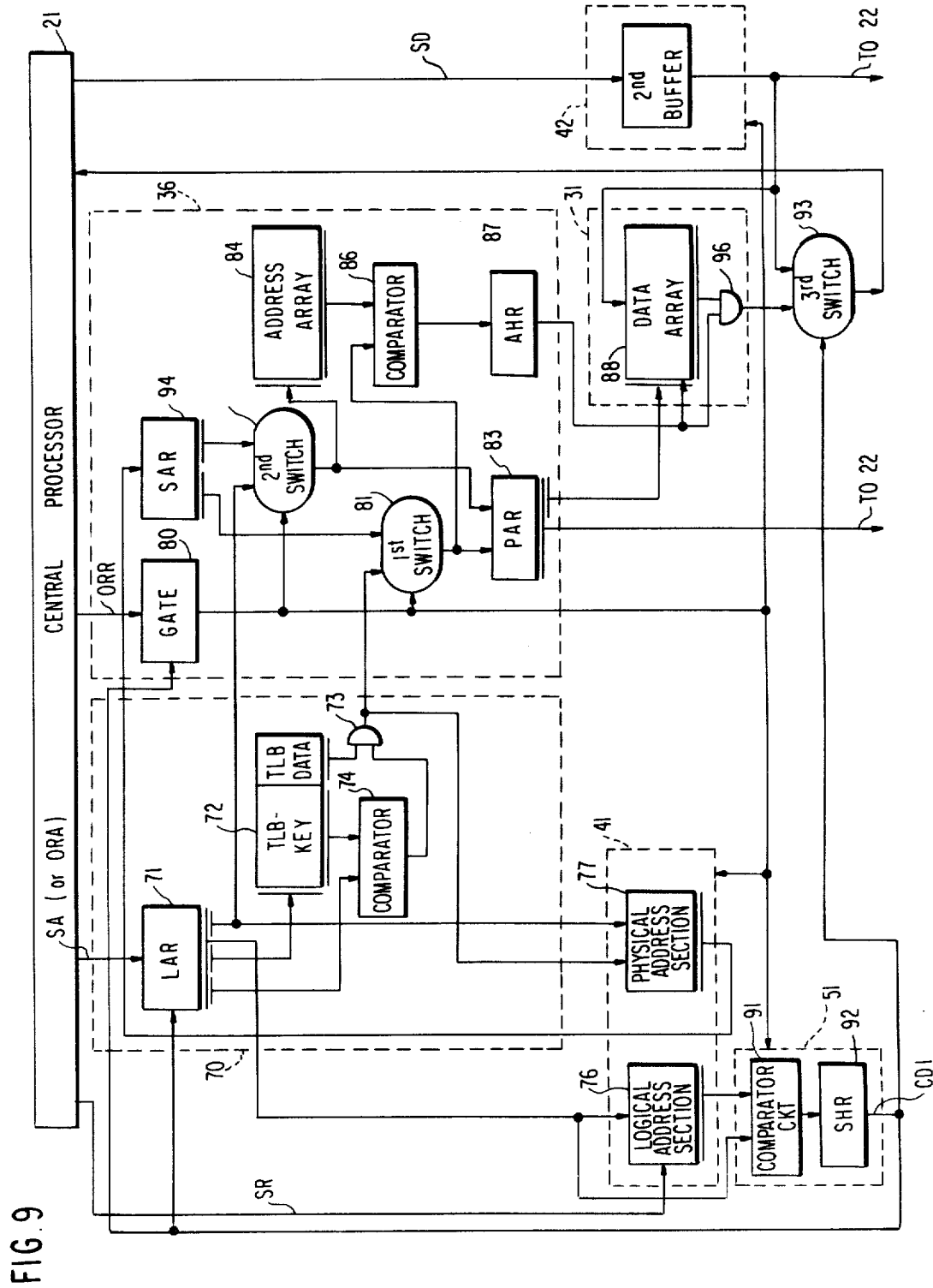
FIG. 9 is a detailed block diagram of a portion of the cache memory arrangement depicted in FIG. 8.

Turning to FIG. 9, operation of the address converter 70 will be described in relation to the first cache memory 31, the first cache control circuit 36, the first and the second buffers 41and 42, and the first coincidence circuit 51. It will readily be possible to make the address converter 70 cooperate with the second cache memory 32 and the second cache control circuit 37.

The address converter 70 comprises a logical address register (depicted by an acronym of LAR hereinafter) 71 supplied with the logical address data as each of the operand readout address data ORA and the storage address data SA. The logical address kept in LAR 71 is partially sent to a known table look-aside buffer (TLB) 72 comprising a key portion (TLB-KEY) and a data portion (TLB-DATA). The TLB-KEY is indexed by a part of the logical address to look up whether or not correspondence between the logical and the physical addresses is registered in the TLB-KEY.

If the correspondence is registered in the TLB-KEY, the TLB-DATA keeps a physical page address representative of a page. In this case, the address converter 70 delivers the physical page address through an AND gate 73 to the first cache control circuit 36 and the first buffer 41 in cooperation with a comparator 74.

If the correspondence is not registered in the TLB-KEY, address conversion is carried out. The results of the address conversion are registered in the TLB-KEY and the TLB-DATA in the manner known in the art.

Let the storage request SR be given from the central processor 21 to the address converter 70. The accompanying store address data SA are simultaneously kept in the LAR 71 in the form of logical store address data. The logical store address data are partially or wholly supplied from the LAR 71 to the first buffer 41. At the same time, the address converter 70 partially converts the logical store address data into physical store address data to supply the physical store address data to the first buffer 41.

The illustrated first buffer 41 comprises a logical address section 76 and a physical address section 77. The logical store address data and the physical store address data are memorized in the logical and the physical address sections 76 and 77, respectively. After production of the store address data SA, the central processor 21 of the pipeline control type supplies the storage data SD to the second buffer 42 to store the storage data SD in the second buffer 42.

Next, let the operand readout request ORR be given from the central processor 21. The operand readout request ORR is delivered to the first and the second buffers 41 and 42 and the first coincidence circuit 51 through a gate 80 incorporated in the first cache control circuit 36. For the time being, the gate 80 will be left out of consideration for convenience of description. The accompanying operand readout address data ORA are simultaneously supplied in the form of logical operand address data to the logical address register 71. The more significant bits of the logical operand address data are converted into a physical page address by the use of the TLB 72, the comparator 74, and the AND gate 73 in any event. The physical page address is sent to a first switch 81 in the first cache control circuit 36. On the other hand, the less significant bits of the logical operand address data are directly sent as a byte address from the logical address register 71 to a second switch 82 of the first cache control circuit 36.

In the presence of the operand readout request ORR, the physical page address and the byte address from the address converter 70 are selected by the first and the second switches 81 and 82, respectively, and are stored in a physical address register (PAR) 83 as a physical address combination. The byte address is partially supplied to an address array 84 serving as a directory for the first cache memory 31. The address array 84 is indexed by a part of the byte address and cooperates with a comparator 86 to check whether or not a block including desired data is registered in the first cache memory 31. Eventually, the comparator 86 supplies an address array hit register (AHR) 87 with a hit signal and a mishit signal when the desired block is found in the address array 84 and is not found therein, respectively.

Thus, when the physical address combination and the hit signal are set in the PAR 83 and the AHR 87, respectively, a data array 88 in the first cache memory 31 becomes accessible.

During presence of the operand readout request ORR, the logical operand address data are partially or wholly supplied from the LAR 71 to a comparator circuit 91 in the first coincidence circuit 51. Although depicted by a single box, the comparator circuit 91 comprises a plurality of comparators equal in number to the entries in the first buffer 41. The comparator circuit 91 compares the logical operand address data with each of the logical store address data memorized in the logical address section 76. The address data to be compared may partially or wholly be compared with each other.

When the compared address data are coincident with each other, the comparator circuit 91 makes a store buffer hit register (SHR) 92 of the first coincidence circuit 51 produce the first coincidence signal $CD_1$.

The first coincidence signal $CD_1$ is delivered from the first coincidence circuit 51 to the LAR 71, the gate 80 in the first cache control circuit 36, and a third switch 93 coupled to the first cache memory 31 and the second buffer 42.

Responsive to the first coincidence signal $CD_1$, the gate 80 interrupts the operand readout request ORR and makes the LAR 71 hold the accompanying logical operand address data. Under the circumstances, the first and the second switches 81 and 82 cannot select the physical page and the byte addresses supplied from the address converter 70. At this time, the physical address section 77 in the first buffer 41 supplies the buffer output address data in the form of physical buffer address data to a store buffer address register (SAR) 94 included in the first cache control circuit 36. Herein, the buffer store request is assumed to be supplied from the physical address section 77 to the SAR 94.

The more and the less significant bits of the physical buffer address data are sent from the SAR 94 to the PAR 83 through the first and the second switches 81 and 82 to be kept in the PAR 83 in the form of a concatenation of physical address data.

At the same time, the less significant bits of the physical buffer address data are partially sent from the address array 84 to check presence and absence of a desired data block in an aforementioned manner. If the desired data block is memorized in the first cache memory 31, the AHR 87 is set to produce the hit signal.

In the presence of the hit signal, the accompanying buffer output data are sent from the second buffer 42 to the first cache memory 31. As a result, the first cache memory 31 is renewed at the address specified by the physical address data.

In the absence of the hit signal, the physical address data set in the PAR 83 are supplied in a usual manner to the main memory 22 together with the accompanying buffer output data kept in the second buffer 42.

The above-mentioned operation may consecutively be carried out until all of the storage data memorized in the second buffer 42 are transferred to the first cache memory 31 and/or the main memory 22. On the other hand, the transfer may be made of only the storage data memorized in an address where the first coincidence signal $CD_1$ appears. In the latter case, the storage data can simultaneously be delivered to the first cache memory 31 and the central processor 21 through the third switch 93, as will readily be understood from FIG. 9.

At any rate, after the storage data are transferred to the first cache memory 31 and/or the main memory 22, the gate 80 is released by disappearance of the first coincidence signal $CD_1$ to supply the first cache control circuit 36 with the operand readout request ORR. Supply of the operand readout request ORR leads the logical operand address data of the LAR 71 to the PAR 83 through the address converter 70 and the first and the second switches 81 and 82.

If any desired data are memorized in the first cache memory 31, the desired data are read out from the data array 88 to the central processor 21 through the third switch 93 and an AND gate 96 enabled by the hit signal.

In the absence of the hit signal, the main memory 22 is accessed by the physical address data kept in the PAR 83.

Thus, the first and the second switches 81 and 82 serve to select the buffer output address data accompanying the buffer store request only when the operand readout requests are absent. The PAR 83 and the AHR 87 serves to selectively produce the buffer output address data and the operand readout address data in cooperation with the address array 84 and the comparator 86.

With the arrangement illustrated with reference to FIGS. 8 and 9, comparison is carried out in the first coincidence circuit 51 by the use of the logical operand address data without any address conversion when the operand readout requests ORR are given to the arrangement. This means that the first coincidence signal $CD_1$ is rapidly produced from the first coincidence circuit 51. In addition, the first buffer 41 is indexed independently of the address array 84. Therefore, the first cache memory 31 and the first cache buffer circuit 36 are simultaneously checked in parallel in response to the operand readout requests ORR.

It is now readily understood that the operand readout request ORR is preferentially processed prior to the buffer store request unless the first coincidence signal $CD_1$ appears from the first coincidence circuit 51. The operand readout request ORR may conflict with the one of the storage requests SR if an additional address converter is connected to the LAR 71 in parallel and if both of the address converters are individually supplied with the operand readout address data and the store address data.

As shown in FIG. 8, the third and the fourth buffers 63 and 64 may be connected parallel with the first and the second buffers 41 and 42.

While this invention has thus far been described in conjunction with several embodiments thereof, it will be readily possible for those skilled in the art to put this invention into practice in various manners. For example, use is possible of a single buffer circuit of a two-read type as a pair of the first and the third buffers 41 and 63 or a pair of the second and the fourth buffers 42 and 64. In FIG. 7, the first and the second coincidence circuits 51 and 52 may be removed, as is the case with FIG. 3. The address converter 70 shown in FIGS. 8 and 9 may be included in the arrangement illustrated in FIG. 3. In FIG. 8 another address converter (not shown) may be connected to the second cache control circuit 37 to convert a logical address accompanying each instruction readout request into a physical address.

What is claimed is:

1. A cache memory arrangement responsive to a sequence of operands and a sequence of instructions memorized in a main memory for making a central processor process said operands in compliance with said instructions in a pipeline fashion to produce storage requests and operand readout requests and instruction readout requests, said storage requests being accompanied by storage data and store address data, said operand and said instruction readout requests being accompanied by operand readout address data and instruction readout address data, respectively, said arrangement comprising:

a first cache memory coupled to said central processor and preliminarily loaded with a plurality of blocks of said operands;

a first cache control circuit responsive to said operand readout requests and the accompanying operand readout address data for controlling said first cache memory;

a second cache memory coupled to said central processor and preliminarily loaded with a plurality of blocks of said instructions;

a second cache control circuit responsive to said instruction readout requests and the accompanying instruction readout address data for controlling said second cache memory;

wherein the improvement comprises:

cache buffer means having a plurality of addressable entries and coupled to said central processor and responsive to said storage requests for individually memorizing the accompanying storage data and store address data to produce the memorized storage data and store address data in pairs as buffer output data and buffer output address data, respectively, together with a buffer store request;

first means for supplying said buffer store request and said buffer output address data to said main memory and said first and said second cache control circuits; and second means for supplying said buffer output data to said main memory and said first and said second cache memories;

said first cache control circuit comprising:

first selecting means coupled to said first means and said central processor and responsive to said operand readout requests and said buffer store request for selecting said buffer store request only when said operand readout requests are absent and for selecting said operand readout requests when said operand readout requests are present even in presence of said buffer store request, the selected buffer store request being accompanied by said buffer output address data; and first producing means coupled to said first selecting means, said first cache and main memories, and said central processor and supplied with said operand readout address data and said buffer output address data for producing said operand readout address data and said buffer output address data when said operand readout requests and said buffer store request are selected by said first selecting means, respectively, said first cache memory storing the buffer output data supplied through said second means in addresses specified by the produced buffer output address data, the produced operand readout address data being transferred to said first cache memory;

said second cache control circuit comprising:

second selecting means coupled to said first means and said centra processor and responsive to said instruction readout requests and said buffer store request for selecting said buffer store request only when said instruction readout requests are absent and for selecting said instruction readout requests when said instruction readout requests are present even in presence of said buffer store request, the selected buffer store request being accompanied by said buffer output address data; and second producing means coupled to said second selecting means, said second cache and said main memories, and said central processor and supplied with said instruction readout address data and said buffer output address data for producing said instruction readout address data and said buffer output address data when said instruction readout requests and said buffer store request are selected by said second selecting means, respectively, said second cache memory storing the buffer output data supplied through said second means in addresses specified by the produced buffer output address data, the produced instruction readout address data being transferred to said second cache memory.

2. A cache memory arrangement as claimed in claim 1, further comprising:

first coincidence means coupled to said cache buffer means and said first cache control circuit and responsive to said operand readout requests and said operand readout address data for comparing said operand readout address data with the store address data memorized in said cache buffer means to supply said first cache control circuit with a first coincidence signal when the compared address data are coincident with each other; and second coincidence means coupled to said cache buffer means and said second cache control circuit and responsive to said instruction readout requests and said instruction readout address data for comparing said instruction readout address data with the store address data memorized in said cache buffer means to supply said second cache control circuit with a second coincidence signal when the compared address data are coincident with each other;

said first cache control circuit comprising first gate means coupled to said central processor, said first coincidence means, and said first selecting means for interrupting said operand readout requests in the presence of said first coincidence signal to supply the buffer store request alone to said first selecting means and thereby to preferentially process the buffer store request prior to the simultaneously supplied one of said operand readout requests;

said second cache control circuit comprising second gate means coupled to said central processor, said second coincidence means, and said second selecting means for interrupting said instruction readout requests in the presence of said second coincidence signal to supply the buffer store request alone to said second selecting means and thereby to preferentially process the buffer store request prior to the simultaneously supplied one of said instruction readout requests.

3. A cache memory arrangement as claimed in claim 2, wherein:

said cache buffer means comprises:

first memory means coupled to said central processor and responsive to said storage requests for memorizing the accompanying store address data to produce said buffer output address data;

first sending means between said first memory means and said first and said second coincidence means for sending to said first and said second coincidence means, the store address data memorized in said first memory means;

second sending means between said central processor and said first and said second coincidence means for sending said operand and said instruction read-out requests to said first and said second coincidence means, respectively;

second memory means coupled to said central processor and responsive to said storage requests for memorizing the accompanying storage data to produce said buffer output data; and means coupled to said first and said second memory means and responsive to said buffer output address data and said buffer output data for producing said buffer store request;

said arrangement further comprising means between said first coincidence means and said second gate means and between said second coincidence means and said first gate means for selectively disabling said second and said first gate means in the presence of said first and said second coincidence signals, respectively.

4. A cache memory arrangement as claimed in claim 3, each of said store address data and said operand read-out address data being a logical address datum indicative of a logical address, said arrangement further comprising address converting means coupled to said central processor for converting the logical addresses into physical addresses corresponding to the respective logical addresses to produce physical address data specifying the respective physical addresses;

said first memory means comprising:

first buffer means coupled to said central processor through said address converting means for holding at least a portion of each of said logical address data to make said first and said second coincidence means compare the logical addresses with the held logical address data as the store address data memorized in said cache buffer means; and second buffer means coupled to said address converting means and responsive to said storage requests for holding said physical address data to supply said first producing means and said second producing means with the held physical address data as said buffer output address data.

5. A cache memory arrangement as claimed in claim 2, wherein:

said cache buffer means comprises:

first memory means coupled to said central processor and responsive to said store requests for memorizing the accompanying store address data to produce said buffer output address data;

second memory means coupled to said central processor and responsive to said storage requests for memorizing the accompanying storage data to produce said buffer output data;

third memory means coupled to said central processor and responsive to said store requests for memorizing the accompanying store address data to produce said buffer address data;

fourth memory means coupled to said central processor and responsive to said storage requests for memorizing the accompanying storage data to produce said buffer output data;

a first connection between said first memory means and said first coincidence means for supplying said first coincidence means with the store address data stored in said first memory means; and a second connection between said third memory means and said second coincidence means for supplying said second coincidence means with the store address data stored in said third memory means;

said first means comprising:

first delivering means coupled to said first memory means, said first cache control circuit, and said main memory for delivering said buffer output address data to said first cache control circuit and said main memory together with said buffer store request; and second delivering means coupled to said third memory means, said second cache control circuit, and said main memory for delivering said buffer output address data to said second cache control circuit and said main memory together with said buffer store request;

second means comprising:

third delivering means coupled to said second memory means, said first cache memory, and said main memory for delivering the buffer ouptput data stored in said second memory means to said first cache memory and said main memory; and fourth delivering means coupled to said fourth memory means, said second cache memory, and said main memory for delivering the buffer output data stored in said fourth memory means to said second cache memory and said main memory.

6. A cache memory arrangement as claimed in claim 5, each of said store address data and said operand readout address data being a logical address datum indicative of a logical address, said arrangement further comprising address converting means coupled to said central processor for converting said logical addresses into physical addresses corresponding to the respective logical addresses to produce physical address data specifying the respective physical addresses;

said first memory means comprising first buffer means coupled to said central processor through said address converting means for holding at least a portion of each of said logical address data to make said first coincidence means compare the logical address data with the held logical address data as the store address data memorized in said cache buffer means; and second buffer means responsive to said storage requests and coupled to said address converting means for holding said physical address data to supply said first producing means with the held physical address data as said buffer output address data;

said third memory means comprising third buffer means coupled to said central processor through said address converting means for holding at least a portion of each of said logical address data to make said second coincidence means compare the logical address data with the held logical address data as the store address data memorized in said cache buffer means; and fourth buffer means responsive to said store requests and coupled to said address converting means for holding said physical address data to supply said second producing means with the held physical address data as said buffer address data.

* * * * *

UNITED STATES PATENT AND TRADEMARK OFFICE
CERTIFICATE OF CORRECTION

PATENT NO. : 4,467,414
DATED : August 21, 1984
INVENTOR(S) : Mikiya AKAGI et al

It is certified that error appears in the above-identified patent and that said Letters Patent is hereby corrected as shown below:

IN THE TITLE:

First page ([54]) "CASHE" (both occurrences, first and second lines, should be --CACHE--.

IN THE ABSTRACT OF THE DISCLOSURE:

Line 11, "for" should be --the--.

IN THE SPECIFICATION:

Column 9, line 41, after "37", insert --are--.

Column 11, line 62, "41and" should be --41 and--.

Column 14, line 13, "read out" should be --readout--.

IN THE CLAIMS:

Column 16, line 2, "centra" should be --central--.

Signed and Sealed this

Ninth Day of April 1985

[SEAL]

Attest:

DONALD J. QUIGG

Attesting Officer     Acting Commissioner of Patents and Trademarks